US012080107B2

(12) United States Patent
Imai (10) Patent No.: US 12,080,107 B2
(45) Date of Patent: Sep. 3, 2024

(54) NOTIFICATION APPARATUS, NOTIFICATION METHOD, AND STORAGE MEDIUM STORING PROGRAM

(71) Applicant: ISUZU MOTORS LIMITED, Tokyo (JP)

(72) Inventor: Akira Imai, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 78 days.

(21) Appl. No.: 17/905,516

(22) PCT Filed: Mar. 10, 2021

(86) PCT No.: PCT/JP2021/009533
§ 371 (c)(1),
(2) Date: Sep. 2, 2022

(87) PCT Pub. No.: WO2021/182511
PCT Pub. Date: Sep. 16, 2021

(65) Prior Publication Data
US 2023/0122897 A1    Apr. 20, 2023

(30) Foreign Application Priority Data

Mar. 11, 2020   (JP) .................... 2020-041746

(51) Int. Cl.
*G07C 5/00* (2006.01)
*G06T 7/00* (2017.01)
(Continued)

(52) U.S. Cl.
CPC ............ *G07C 5/006* (2013.01); *G06T 7/0002* (2013.01); *G06T 7/74* (2017.01); *H04N 23/632* (2023.01);
(Continued)

(58) Field of Classification Search
CPC ......... G07C 5/006; G06T 7/0002; G06T 7/74; G06T 2200/24; G06T 2207/30248;
(Continued)

(56) References Cited

U.S. PATENT DOCUMENTS

2010/0274607 A1* 10/2010 Carresjo ............. B60C 23/0477
342/357.34
2019/0258251 A1*  8/2019 Ditty ...................... G06V 20/58
(Continued)

FOREIGN PATENT DOCUMENTS

JP       H05246203 A      9/1993
JP       H08278116 A     10/1996
(Continued)

OTHER PUBLICATIONS

International Search Report of PCT/JP2021/009533 dated May 11, 2021.

*Primary Examiner* — Dramos Kalapodas
(74) *Attorney, Agent, or Firm* — Shih IP Law Group, PLLC (57) ABSTRACT

A notification apparatus comprises a receiving part that receives a designation of a reference position; a specifying part that specifies a current wheel nut at the same position as a reference wheel nut, which is one of a plurality of wheel nuts included in a reference image that is a captured image acquired by the acquiring part in the past, from the captured image acquired by the acquiring part, with respect to the reference position; and a detecting part that detects looseness of the current wheel nut by detecting that the current wheel nut specified by the specifying part has rotated with respect to the reference wheel nut included in the reference image.

6 Claims, 7 Drawing Sheets

(51) Int. Cl.
*G06T 7/73* (2017.01)
*H04N 23/60* (2023.01)
*H04N 23/63* (2023.01)

(52) U.S. Cl.
CPC ......... *H04N 23/64* (2023.01); *G06T 2200/24* (2013.01); *G06T 2207/30248* (2013.01)

(58) Field of Classification Search
CPC .......... G06T 7/001; G06T 2207/30108; H04N 23/632; H04N 23/64; B60B 2900/3312; B60B 3/16; G01M 17/013
See application file for complete search history.

(56) References Cited

U.S. PATENT DOCUMENTS

| | | | |
|---|---|---|---|
| 2019/0265703 A1* | 8/2019 | Hicok | G05D 1/249 |
| 2020/0226902 A1* | 7/2020 | Mandaric | G06F 9/445 |
| 2023/0005118 A1* | 1/2023 | Michimura | G06T 5/80 |

FOREIGN PATENT DOCUMENTS

| | | | | |
|---|---|---|---|---|
| JP | 2011053059 A | 3/2011 | | |
| JP | 2014089068 A | 5/2014 | | |
| JP | 2016187977 A | 11/2016 | | |
| WO | WO-2016158587 A1 * | 10/2016 | ............... | B60B 3/16 |

\* cited by examiner

NOTIFICATION APPARATUS, NOTIFICATION METHOD, AND STORAGE MEDIUM STORING PROGRAM

CROSS-REFERENCE TO RELATED APPLICATIONS

The present application is a U.S. National Stage entry of PCT Application number PCT/JP2021/9533, filed on Mar. 10, 2021, which claims priority under 35 U.S.C § 119(a) to Japanese Patent Application No. 2020-041746, filed on Mar. 11, 2020, contents of which are incorporated herein by reference in their entirety.

TECHNICAL FIELD

The present disclosure relates to a notification apparatus, a notification method, and a storage medium storing a program for notifying that a wheel nut is loose.

BACKGROUND OF THE INVENTION

A technique for automatically detecting looseness of a wheel nut is known (for example, see Patent Document 1). Patent Document 1 describes measuring strain of a spacer member which receives a fastening force from a wheel nut with a strain sensor, and detecting looseness of the wheel nut based on the measurement result.

PRIOR ART

Patent Document

Patent Document 1: Japanese Unexamined Patent Application Publication No. 2016-187977

BRIEF DESCRIPTION OF THE INVENTION

Problem to be Solved by the Invention

In the method described in Patent Document 1, since it is necessary to attach a strain sensor to each wheel nut and to secure a power supply and a communication device for the strain sensors, there is a problem that the operation for detecting looseness of a wheel nut is complicated.

It is an object of the present disclosure to provide a notification apparatus and a notification method program that can simplify the operation of detecting looseness of a wheel nut.

Means for Solving the Problem

A notification apparatus of the first aspect of the present disclosure includes an acquiring part that acquires a captured image of a wheel of a vehicle, a receiving part that receives a designation of a reference position for identifying positions of a plurality of current wheel nuts provided on the wheel in the captured image, a storage part that stores a reference image, which is the captured image acquired by the acquiring part in the past, and the reference position of the reference image in association with each other, a specifying part that selects a reference wheel nut, which is one of a plurality of wheel nuts included in the reference image, based on the reference position of the reference image, and specifies the current wheel nut at the same position as the reference wheel nut from the captured image acquired by the acquiring part, with respect to the reference position received by the receiving part, a detecting part that detects looseness of the current wheel nut by detecting that the current wheel nut specified by the specifying part has rotated with respect to the reference wheel nut included in the reference image, and a notifying part that notifies a user that the current wheel nut is loose when the detecting part detects looseness of the current wheel nut.

The notification apparatus may further include a display control part that causes a display part to display, as a preliminary display image, the captured image captured before an instruction to capture an image is issued by a user, wherein the receiving part may receive the designation of the reference position with respect to a display area of the preliminary display image. The acquiring part may acquire the captured image when the receiving part receives the designation of the reference position.

The notification apparatus may further include a display control part that displays, as a preliminary display image, the captured image captured before an instruction to capture an image is issued by a user, and causes the display part to display the preliminary display image including a frame for designating the reference position. The notifying part may notify a user that a wheel included in the reference image differs from a wheel included in the captured image, if the detecting part detects looseness of a predetermined number or more of the current wheel nuts of the wheel included in the captured image. The detecting part may calculate a rotation angle at which the current wheel nut has rotated with respect to the reference wheel nut, and may detect looseness of the current wheel nut if the calculated rotation angle is equal to or greater than a threshold value.

A notification method of the second aspect of the present disclosure includes the steps, executed by a computer, of acquiring a captured image of a wheel of a vehicle, receiving a designation of a reference position for identifying positions of a plurality of current wheel nuts provided on the wheel in the captured image, storing a reference image, which is the captured image acquired in the past, and the reference position of the reference image, in association with each other, selecting a reference wheel nut, which is one of a plurality of wheel nuts included in the reference image, based on the reference position of the reference image, and specifying the current wheel nut at the same position as the reference wheel nut from the acquired captured image with respect to the received reference position, detecting looseness of the current wheel nut by detecting that the specified current wheel nut has rotated with respect to the reference wheel nut included in the reference image, and notifying a user that the current wheel nut is loose when looseness of the current wheel nut is detected.

A program of the third aspect of the present disclosure causes a computer to execute the steps of acquiring a captured image of a wheel of a vehicle, receiving a designation of a reference position for identifying positions of a plurality of current wheel nuts provided on the wheel in the captured image, storing a reference image, which is the captured image acquired in the past, and the reference position of the reference image, in association with each other, selecting a reference wheel nut, which is one of a plurality of wheel nuts included in the reference image, based on the reference position of the reference image, and specifying the current wheel nut at the same position as the reference wheel nut from the acquired captured image with respect to the received reference position, detecting looseness of the current wheel nut by detecting that the specified current wheel nut has rotated with respect to the reference wheel nut included in the reference image, and notifying a user that the current wheel nut is loose when looseness of the current wheel nut is detected.

Effect of the Invention

According to the present disclosure, it is possible to simplify the operation of detecting looseness of a wheel nut.

DESCRIPTION OF EMBODIMENTS

[Outline of the Notification Apparatus]

Figure 1:
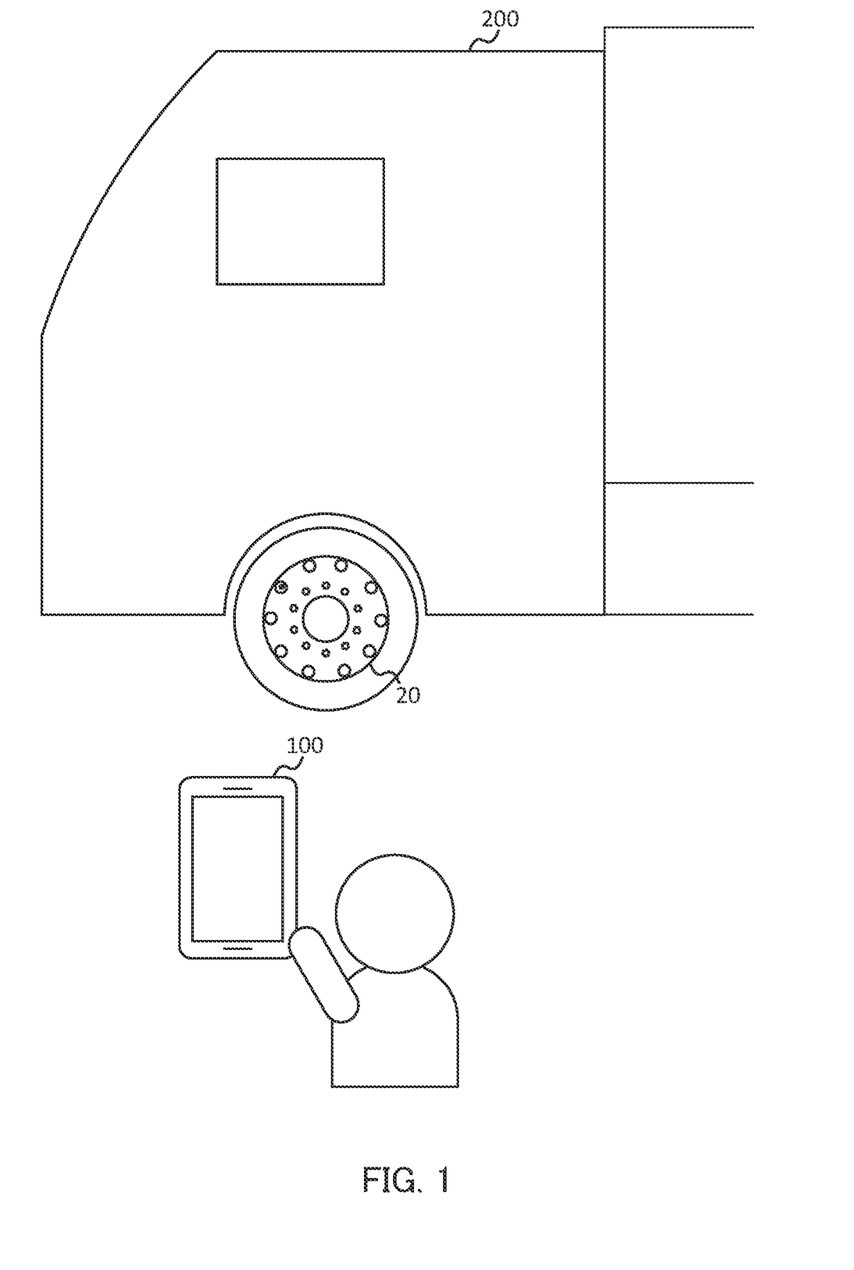
FIG. 1 is a diagram showing an outline of a notification apparatus according to an embodiment.

FIG. 1 is a diagram showing an outline of a notification apparatus 100 according to the present embodiment. The notification apparatus 100 is an apparatus managed by an operator who inspects a vehicle 200, and is, for example, an information terminal such as a smartphone or a tablet. The vehicle 200 is, for example, a commercial vehicle such as a truck. The notification apparatus 100 detects looseness of a plurality of wheel nuts provided on a wheel 20 of the vehicle 200.

First, the notification apparatus 100 acquires a captured image of the wheel 20. The notification apparatus 100 reads a reference image, which is a captured image obtained by capturing the same wheel 20 as in a captured image acquired in the past, from the storage part. The reference image is an image obtained when it was confirmed previously that each wheel nut of the wheel 20 was not loose, for example. Further, the reference image may be an image obtained when the wheel 20 was captured previously. The notification apparatus 100 specifies a current wheel nut at the same position as one wheel nut (also referred to below as a reference wheel nut) among the wheel nuts included in the reference image, from among the plurality of wheel nuts included in the captured image (referred to below as current wheel nuts).

Although details will be described later, the notification apparatus 100 detects looseness of the current wheel nut by determining whether or not the current wheel nut has rotated with respect to the reference wheel nut included in the reference image. When the notification apparatus 100 detects looseness of the current wheel nut, the notification apparatus 100 notifies the user that the current wheel nut is loose. In this way, the notification apparatus 100 can simplify the operation of detecting looseness of the wheel nut.

[Configuration of the Notification Apparatus]

Figure 2:
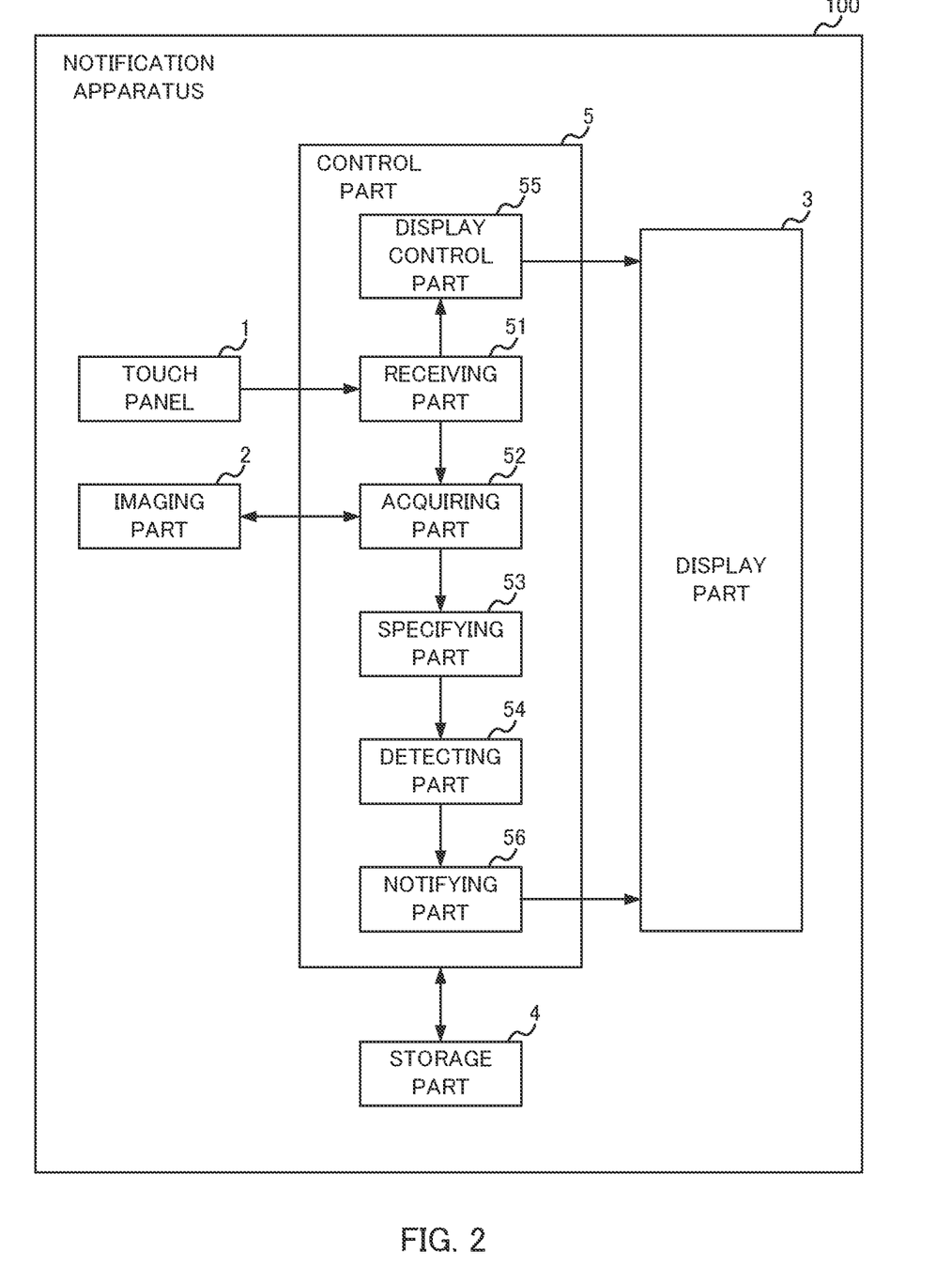
FIG. 2 is a diagram showing a configuration of the notification apparatus.

FIG. 2 is a diagram showing a configuration of the notification apparatus 100. The notification apparatus 100 includes a touch panel 1, an imaging part 2, a display part 3, a storage part 4, and a control part 5. The touch panel 1 receives a user's operation on the display surface of the display part 3. The imaging part 2 captures an image of the wheel 20 of the vehicle 200. The display part 3 is a display that displays images, characters, and the like. The storage part 4 includes, for example, a ROM (Read Only Memory). a RAM (Random Access Memory), and the like.

The control part 5 is, for example, a CPU (Central Processing Unit). The control part 5 functions as a receiving part 51, an acquiring part 52, a specifying part 53, a detecting part 54, a display control part 55, and a notifying part 56 by executing a program stored in the storage part 4.

The receiving part 51 receives a user's operation on the touch panel 1. The receiving part 51 receives, for example, an operation of designating a reference position for identifying positions of a plurality of current wheel nuts provided on the wheel 20 in the captured image.

[Designation of the Reference Position]

Figure 3:
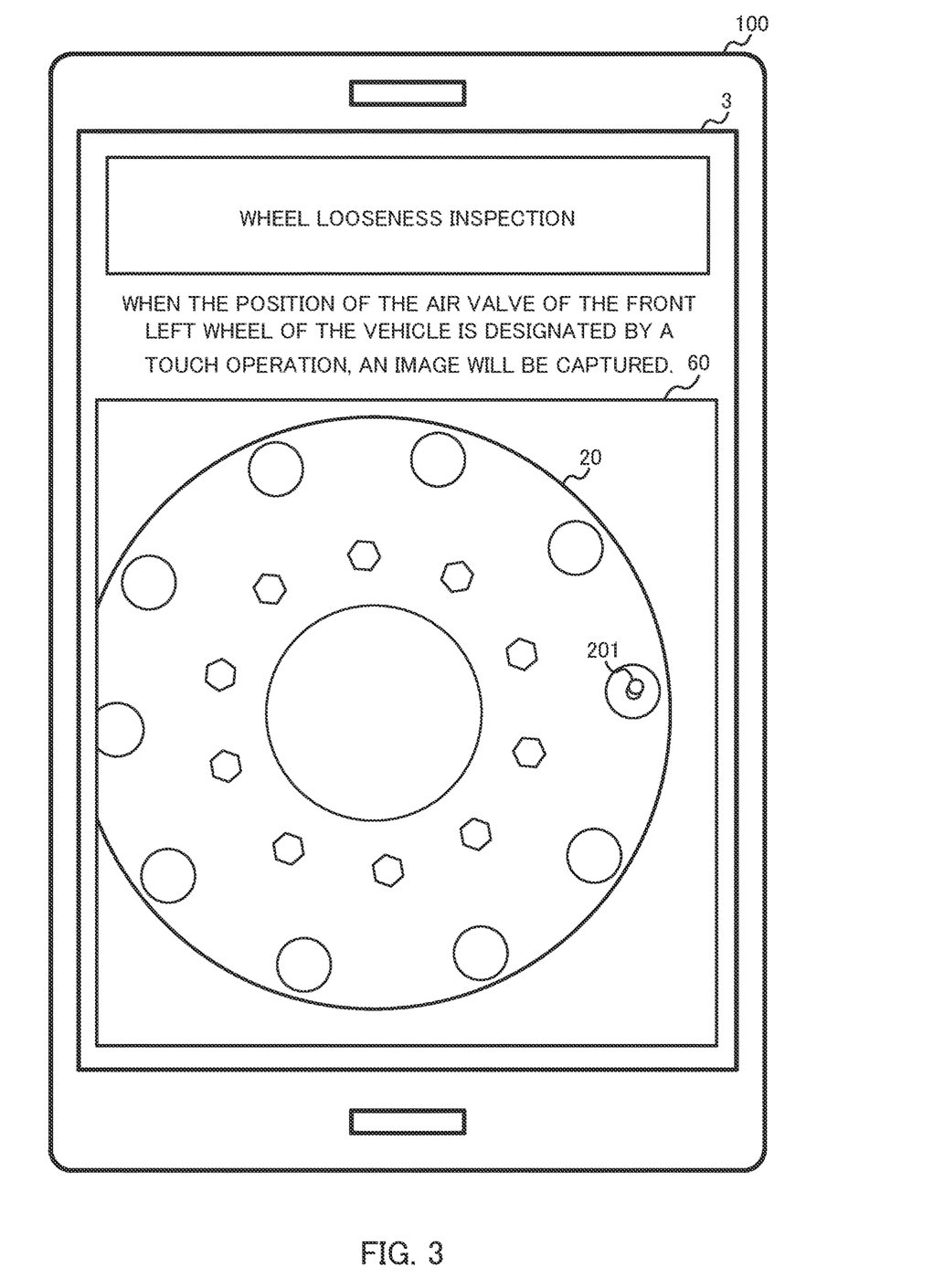
FIG. 3 is a diagram illustrating an example of a process by which a receiving part receives a reference position.

FIG. 3 is a diagram illustrating an example of a process in which the receiving part 51 receives a reference position. FIG. 3 shows a state in which the imaging part 2 captures an image of the wheel 20. A captured image captured before an image capturing instruction is issued by the user is displayed as a preliminary display image on the display part 3.

For example, it is assumed that, in a state in which an application of the notification apparatus 100 for performing a pre-travel inspection of the vehicle 200 is started, the inspection of the wheel nuts is selected by the user from among a plurality of inspection items for the pre-travel inspection. In the inspection of the wheel nuts, after a message instructing image capturing of the front left wheel 20 of the vehicle 200 is displayed on the display part 3, the preliminary display image shown in FIG. 3 is displayed when the receiving part 51 receives an instruction from a user to display the preliminary display image.

In the example of FIG. 3, the preliminary display image includes a wheel 20 of the vehicle 200. The wheel 20 includes a plurality of current wheel nuts and one air valve 201. The receiving part 51 receives a designation of the reference position of the wheel 20 with respect to the display area 60 of the preliminary display image. The reference position is the position of the air valve 201 in the example of this Specification.

The acquiring part 52 acquires the captured image obtained by imaging the wheel 20 of the vehicle 200 with the imaging part 2. For example, the acquiring part 52 acquires the captured image when the receiving part 51 receives the designation of the reference position. In the example of FIG. 3, a message of "When the position of the air valve of the front left wheel of the vehicle is designated by a touch operation, an image will be captured." is displayed on the display part 3. When the receiving part 51 receives an operation of designating the position of the air valve as the reference position, the acquiring part 52 acquires a captured image of the wheel 20. Therefore, the user does not need to separately issue instructions to acquire the captured image.

The specifying part 53 specifies relative positions of the plurality of current wheel nuts with respect to the reference position included in the captured image acquired by the acquiring part 52. For example, from the captured image acquired by the acquiring part 52, the specifying part 53 specifies the ordinal number of each of the current wheel nuts in the clockwise direction from the reference position of the wheel 20, as the relative positions.

The storage part 4 stores a reference image, which is a captured image of the wheel 20 acquired in the past by the acquiring part 52, information indicating the reference position of the reference image, and vehicle identification information for identifying the vehicle 200, in association with each other. The reference position of the reference image is a position designated by the receiving part 51 while the reference image is displayed as the preliminary display image on the display part 3. The acquiring part 52 stores the captured image serving as the reference image in the storage part 4, in association with the information indicating the reference position designated by the receiving part 51.

The specifying part 53 reads, from the storage part 4, i) the reference image corresponding to the same wheel as the wheel corresponding to the captured image and ii) the information indicating the reference position of this reference image, from among the reference images associated with the vehicle identification information selected by the user in the application of the notification apparatus 100 for performing the pre-travel inspection of the vehicle 200. A plurality of reference images corresponding to a plurality of wheels 20 of the vehicle 200 are associated with one piece of vehicle identification information. As an example, the specifying part 53 reads a reference image including the front left wheel 20 corresponding to the message "When the position of the air valve of the front left wheel of the vehicle is designated by a touch operation, an image will be captured." (FIG. 3) displayed on the display part 3, from among the plurality of reference images associated with the vehicle identification information selected by the user.

The specifying part 53 selects any one of the plurality of current wheel nuts included in the read reference image, as the reference wheel nut. The specifying part 53 selects the reference wheel nut based on the reference position of the reference image. For example, the specifying part 53 selects the first wheel nut in the clockwise direction, with the reference position as a starting point, as the reference wheel nut. The specifying part 53 specifies the current wheel nut 202 at the same position, with respect to the reference position, as the selected reference wheel nut, based on the relative position of the specified current wheel nut.

[Detection of Looseness of the Current Wheel Nut]

The detecting part 54 detects looseness of the current wheel nut by detecting that the current wheel nut specified by the specifying part 53 has rotated with respect to the reference wheel nut included in the reference image.

Figure 4:
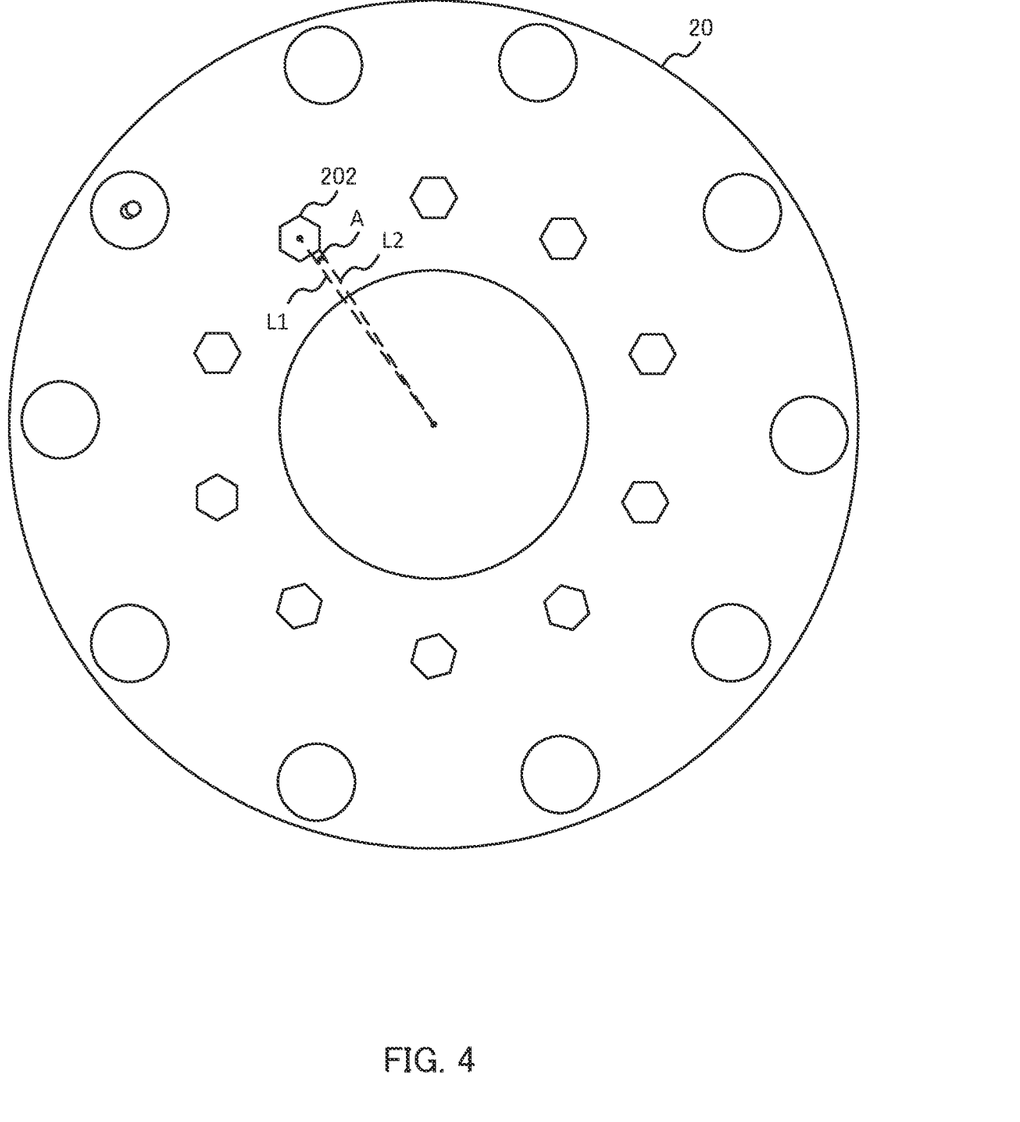
FIG. 4 is a diagram showing an example of a method of detecting looseness of a current wheel nut with a detecting part.

FIG. 4 is a diagram showing an example of a method of detecting looseness of the current wheel nut 202 performed by the detecting part 54. The detecting part 54 identifies a line segment L1 connecting the center of the current wheel nut 202 specified by the specifying part 53 and the axle of the wheel 20. The detecting part 54 selects, from among the six vertices of the hexagonal shape of the current wheel nut 202, the vertex whose distance to the axle of the wheel 20 is shortest. The detecting part 54 identifies a line segment L2 connecting the selected vertex and the axle of the wheel 20. The detecting part 54 calculates an angle A formed by the line segment L1 and the line segment L2. The detecting part 54 reads an angle A' obtained in the same manner in the reference image, from the storage part 4.

If the angle A' does not match the angle A, it is understood that the current wheel nut 202 has rotated from the time when the reference image was captured. If the difference between the calculated angles is equal to or greater than a first threshold value, the detecting part 54 detects looseness of the current wheel nut 202. The first threshold value is, for example, an angle set in advance as a maximum value of the angle of tolerable change relative to the angle of the reference wheel nut. The first threshold value may be a minimum value of an angle detectable by the detecting part 54. On the other hand, if the difference between the calculated angles is less than the first threshold value, the detecting part 54 does not detect looseness of the current wheel nut 202.

Further, the detecting part 54 may detect that the current wheel nut 202 has rotated with respect to the reference wheel nut if the difference between i) the rotation angle of the reference wheel nut in the rotation direction with respect to the reference position of the reference image and ii) the rotation angle of the current wheel nut 202 in the rotation direction with respect to the reference position of the captured image in which the current wheel nut 202 is captured is equal to or greater than a second threshold value.

For example, the detecting part 54 rotates the reference image so that the reference position is positioned immediately below the reference wheel nut. Similarly, the detecting part 54 rotates the captured image so that the reference position is positioned immediately below the current wheel nut 202 specified by the specifying part 53. The detecting part 54 compares the reference wheel nut after the rotation of the reference image to the current wheel nut 202 after the rotation of the captured image. The detecting part 54 calculates a rotation angle at which the current wheel nut 202 is rotated relative to the reference wheel nut. If the calculated rotation angle is equal to or greater than the second threshold value, the detecting part 54 detects looseness of the current wheel nut 202. The second threshold value is, for example, an angle set in advance as a maximum value of the angle of tolerable change relative to the angle of the reference wheel nut. The second threshold value may be a minimum value of an angle detectable by the detecting part 54.

The display control part 55 displays various images and characters on the display part 3. For example, the display control part 55 causes the display part 3 to display a message instructing image capturing of the front left wheel 20 of the vehicle 200 at the time when the wheel nuts are inspected. As shown in FIG. 3, the display control part 55 causes the display part 3 to display, as a preliminary display image, a captured image that was captured before an instruction to capture an image was issued by the user.

[Notification of Looseness of a Wheel Nut]

Figure 5:
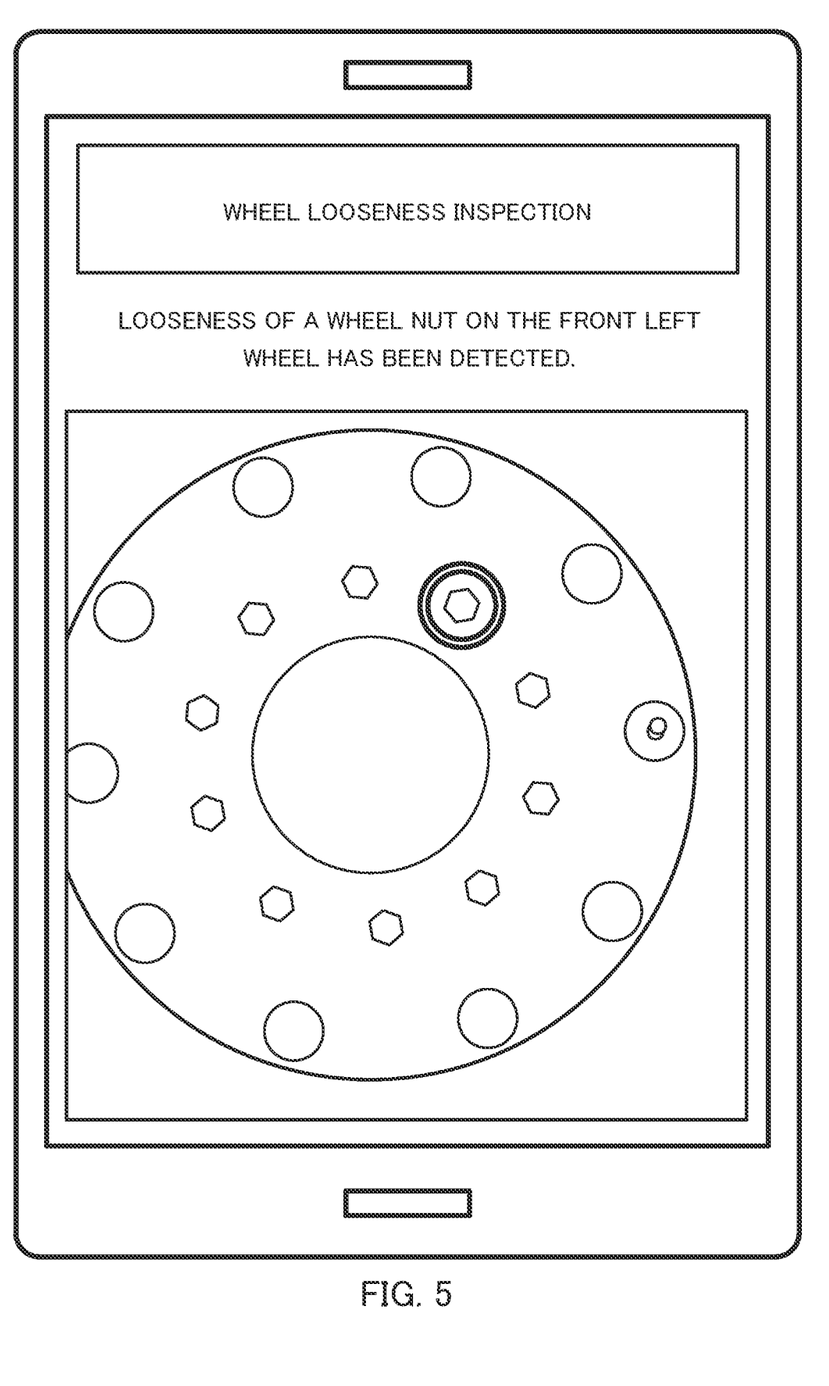
FIG. 5 is a diagram showing an example of a method by which a notifying part notifies about looseness of the current wheel nut.

When the detecting part 54 detects looseness of the current wheel nut 202, the notifying part 56 notifies the user that the current wheel nut 202 is loose. FIG. 5 is a diagram showing an example of a method in which the notifying part 56 provides notification of looseness of the current wheel nut 202. The notifying part 56 displays a message indicating that looseness of the current wheel nut 202 is detected. The notifying part 56 displays information indicating the current wheel nut 202 that has been detected to be loose by the detecting part 54. In the example of FIG. 5, the notifying part 56 causes the display part 3 to display a double circle indicating the current wheel nut 202 detected to be loose by the detecting part 54, on the captured image of the wheel 20.

If the detecting part 54 detects looseness of a large number of current wheel nuts 202 included in the same wheel 20, there is a possibility that the wheel 20 included in the reference image may be different from the wheel 20 included in the captured image. If the detecting part 54 detects looseness of a prescribed number or more of the current wheel nuts 202 of the wheel 20 included in the captured image, the notifying part 56 notifies the user that the wheel included in the reference image is different from the wheel included in the captured image. The predetermined number is, for example, about one half of the total number of current wheel nuts 202 included in the wheel 20.

[Procedure for Detecting Looseness of a Wheel Nut]

Figure 6:
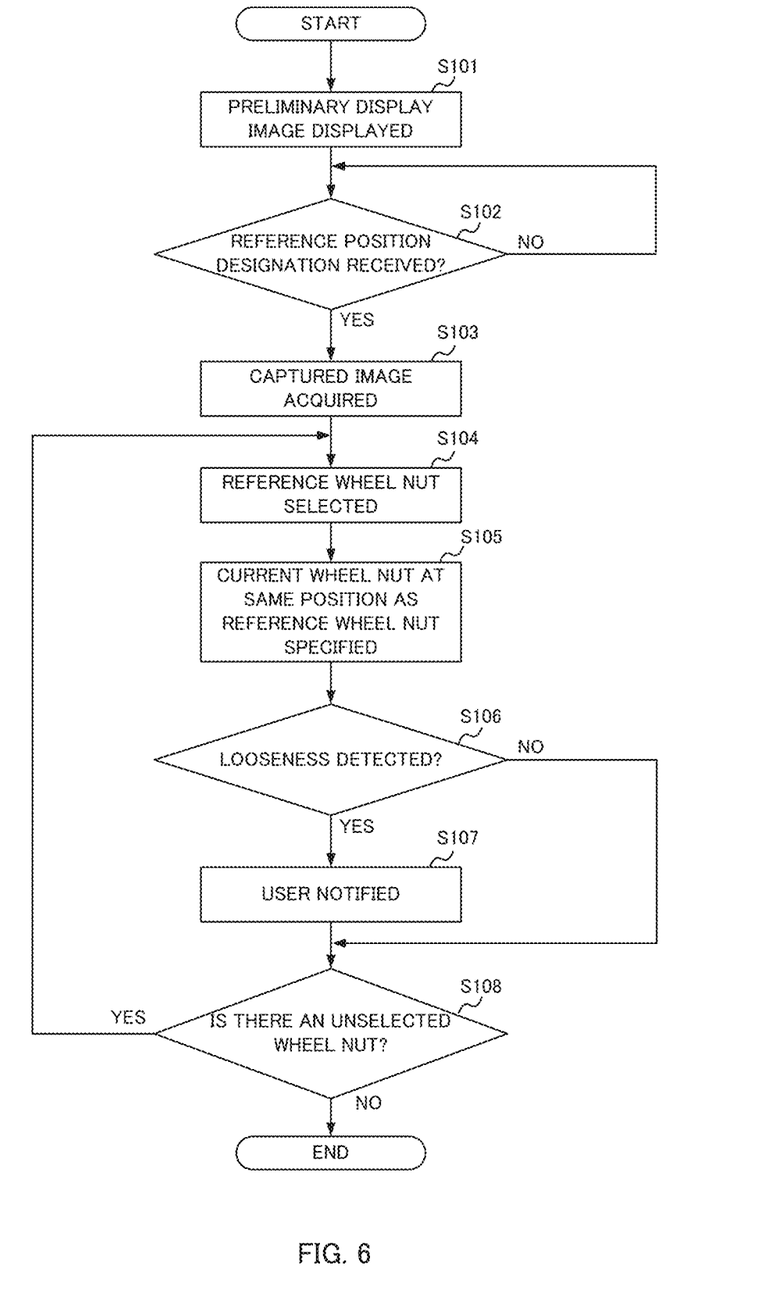
FIG. 6 is a flowchart showing a procedure of detecting looseness of a wheel nut performed by the notification apparatus.

FIG. 6 is a flowchart showing a procedure for detecting looseness of a wheel nut performed by the notification apparatus 100. This procedure is started, for example, when the receiving part 51 receives the user's instruction to display the preliminary display image, after a message instructing image capturing of one of the plurality of wheels 20 of the vehicle 200 has been displayed on the display part 3, for example.

First, the display control part 55 displays the preliminary display image on the display part 3 (S101). The receiving part 51 determines whether or not a designation of a reference position has been received (S102). If the receiving part 51 has received the designation of the reference position (YES in S102), the acquiring part 52 acquires the captured image of the wheel 20 of the vehicle 200 (S103). The specifying part 53 reads the reference image, which is the captured image of the same wheel 20 acquired in the past by the acquiring part 52, from the storage part 4. The specifying part 53 selects an unselected wheel nut from among the plurality of wheel nuts included in the reference image, as the reference wheel nut (S104).

The specifying part 53 specifies the current wheel nut 202 at the same position as the selected reference wheel nut (S105). The detecting part 54 detects whether or not the current wheel nut 202 is loose, by detecting whether the current wheel nut 202 specified by the specifying part 53 has rotated with respect to the reference wheel nut. The notifying part 56 determines whether or not the detecting part 54 has detected looseness of the current wheel nut 202 (S106). When the notifying part 56 determines that the detecting part 54 has detected looseness of the current wheel nut 202 (YES in S106), the notifying part 56 notifies the user that the current wheel nut 202 is loose (S107). The specifying part 53 determines whether or not there is an unselected wheel nut among the plurality of wheel nuts included in the reference image (S108). If it is determined that there are no unselected wheel nuts (NO in S108), the specifying part 53 ends the processing.

If it is determined in S102 that a designation of the reference position has not been received (NO in S102), the receiving part 51 repeats the determination of S102. When the notifying part 56 determines that the detecting part 54 has not detected looseness of the current wheel nut 202 in the determination of S106 (NO in S106), the process proceeds to the determination of S108. If the specifying part 53 determines in S108 that there is an unselected wheel nut (YES in S108), the processing returns to S104.

Effects of the Present Invention

According to the present embodiment, the detecting part 54 can detect looseness of a current wheel nut 202 by detecting that the current wheel nut 202 is rotated with respect to the reference wheel nut. Therefore, the notification apparatus 100 can simplify the operation of detecting looseness of the wheel nut.

[Variation of Designating the Reference Position]

Figure 7:
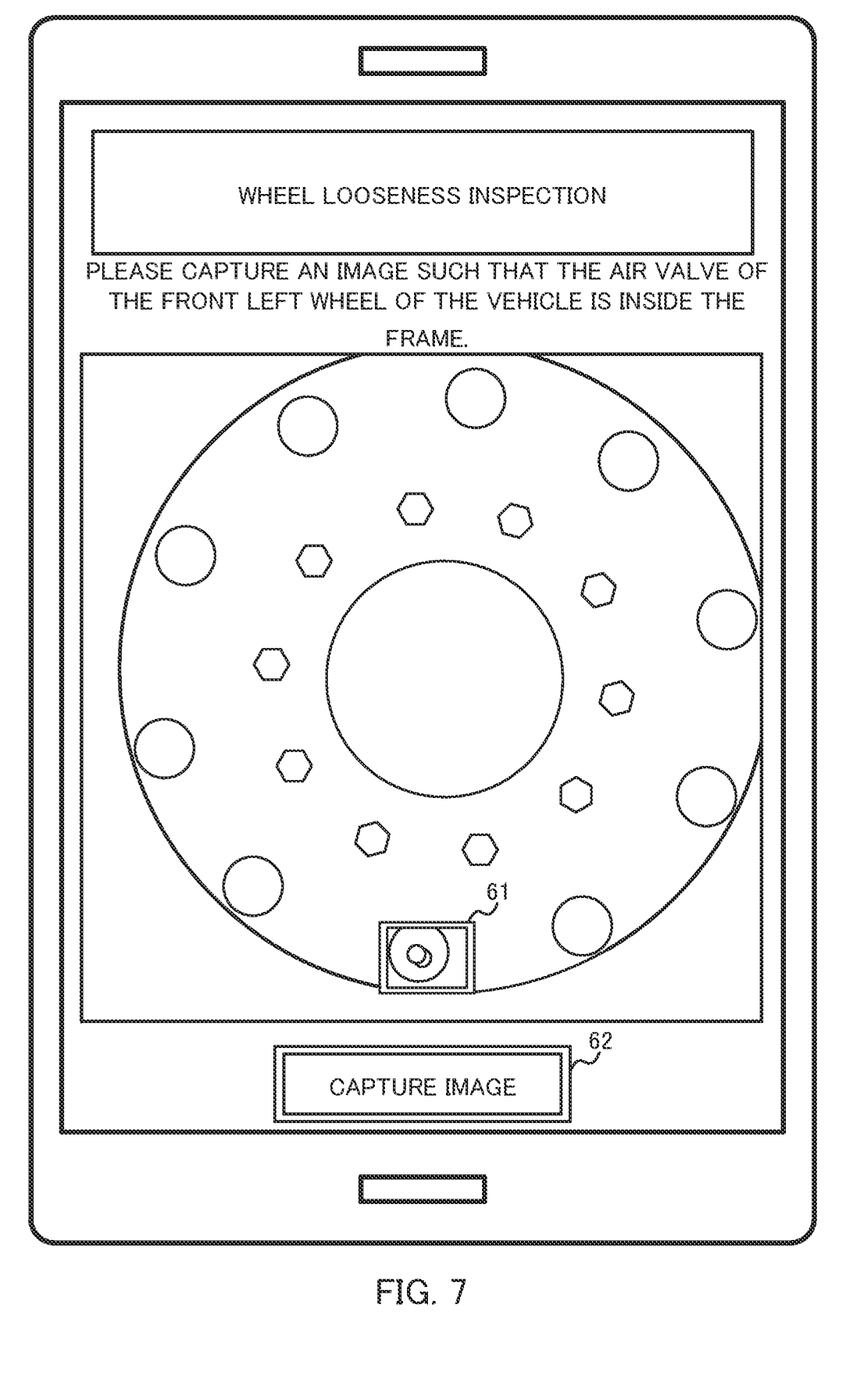
FIG. 7 is a diagram illustrating another example of a process by which the receiving part receives a designation of a reference position.

In the example of FIG. 3, the receiving part 51 receives the designation of the reference position such that the position where the touch operation by the user is performed is set as the reference position. However, the present disclosure is not limited to this. The receiving part 51 may receive the designation of the reference position by using a frame for designating the reference position. FIG. 7 is a diagram showing another example of a process in which the receiving part 51 receives the designation of the reference position. In the example of FIG. 7, the display control part 55 causes the display part 3 to display a preliminary display image including a frame 61 for designating the reference position. In the example of FIG. 7, a message "Please capture an image such that the air valve of the front left wheel of the vehicle is inside the frame." is displayed. When the receiving part 51 receives the operation of an image capturing button 62 by the user, the acquiring part 52 acquires a captured image of the wheel 20. At this time, the receiving part 51 may receive the operation of the image capturing button 62 while assuming that the position inside the frame 61 is designated as the reference position.

Further, the receiving part 51 is not limited to an example of receiving the designation of the reference position in the display area 60 of the preliminary display image. For example, the display control part 55 displays the captured image of the wheel 20 acquired by the acquiring part 52 on the display part 3. The receiving part 51 may receive the designation of the reference position in the display area of the captured image displayed on the display part 3.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF THE REFERENCE NUMERALS 1 touch panel
2 imaging part
3 display part
4 storage part
5 control part
20 wheel
51 receiving part
52 acquiring part
53 specifying part
54 detecting part
55 display control part
56 notifying part
60 display area
61 frame
62 image capturing button
100 notification apparatus
200 vehicle
201 air valve
202 current wheel nut

What is claimed is:
1. A notification apparatus comprising:
an acquiring part that acquires a captured image of a wheel of a vehicle;
a receiving part that receives a designation of a reference position for identifying positions of a plurality of current wheel nuts provided on the wheel in the captured image;

a storage part that stores a reference image, which is the captured image acquired by the acquiring part in the past, and the reference position of the reference image in association with each other;

a specifying part that selects a reference wheel nut, which is one of a plurality of wheel nuts included in the reference image, based on the reference position of the reference image, and specifies the current wheel nut at the same position as the reference wheel nut from the captured image acquired by the acquiring part, with respect to the reference position received by the receiving part;

a detecting part that detects looseness of the current wheel nut by detecting that the current wheel nut specified by the specifying part has rotated with respect to the reference wheel nut included in the reference image; and a notifying part that notifies a user that the current wheel nut is loose when the detecting part detects looseness of the current wheel nut; and a display control part that (i) displays as a preliminary display image, preliminary captured image which is preliminarily captured before an instruction to capture an image is issued by a user, and which is overlapped by a frame for designating the reference position, and (ii) displays a text for instructing to put a part of the wheel that should be designated as the reference position within the frame, wherein:

the receiving part receives a position within the frame as the reference position in response to receive an information including an instruction for acquiring the captured image.

2. The notification apparatus according to claim 1, wherein:

the acquiring part acquires the captured image when the receiving part receives the designation of the reference position.

3. The notification apparatus according to claim 1, wherein:

the notifying part notifies a user that a wheel included in the reference image differs from a wheel included in the captured image, if the detecting part detects looseness of a predetermined number or more of the current wheel nuts of the wheel included in the captured image.

4. The notification apparatus according to claim 1, wherein:

the detecting part calculates a rotation angle at which the current wheel nut has rotated with respect to the reference wheel nut, and detects looseness of the current wheel nut if the calculated rotation angle is equal to or greater than a threshold value.

5. A notification method comprising the steps, executed by a computer, of:

displaying on a display part (i) a preliminary display image in which a frame for designating a reference position for recognizing a plurality of current wheel nuts arranged in a wheel of a vehicle is overlapped on a preliminary captured image captured preliminarily before an instruction to capture an image is issued by a user, and (ii) a text for instructing to put a part of the wheel that should be designated as the reference position within the frame;

acquiring the captured image of the wheel in response to receive an information including an instruction for acquiring the captured image;

receiving, as the reference position, a position within the frame in the captured image;

storing a reference image, which is the captured image acquired in the past, and the reference position of the reference image, in association with each other;

selecting a reference wheel nut, which is one of a plurality of wheel nuts included in the reference image, based on the reference position of the reference image, and specifying the current wheel nut at the same position as the reference wheel nut from the acquired captured image with respect to the received reference position;

detecting looseness of the current wheel nut by detecting that the specified current wheel nut has rotated with respect to the reference wheel nut included in the reference image; and notifying a user that the current wheel nut is loose when looseness of the current wheel nut is detected.

6. A non-transitory computer-readable storage medium storing a program for causing a computer to execute the steps of:

displaying on a display part (i) a preliminary display image in which a frame for designating a reference position for recognizing a plurality of current wheel nuts arranged in a wheel of a vehicle is overlapped on a preliminary captured image captured preliminarily before an instruction to capture an image is issued by a user, and (ii) a text for instructing to put a part of the wheel that should be designated as the reference position within the frame;

acquiring the captured image of the wheel in response to receive an information including an instruction for acquiring the captured image;

receiving, as the reference position, a position within the frame in the captured image;

storing a reference image, which is the captured image acquired in the past, and the reference position of the reference image, in association with each other;

selecting a reference wheel nut, which is one of a plurality of wheel nuts included in the reference image, based on the reference position of the reference image, and specifying the current wheel nut at the same position as the reference wheel nut from the acquired captured image with respect to the received reference position;

detecting looseness of the current wheel nut by detecting that the specified current wheel nut has rotated with respect to the reference wheel nut included in the reference image; and notifying a user that the current wheel nut is loose when looseness of the current wheel nut is detected.

* * * * *